(12) United States Patent
Tam

(10) Patent No.: US 8,760,792 B1
(45) Date of Patent: Jun. 24, 2014

(54) METHODS AND DEVICES FOR DETERMINING THERMALLY-INDUCED EXPANSION OF MAGNETIC RECORDING MEDIA

(75) Inventor: Zong Yuan Tam, Seri Kembangan (MY)

(73) Assignee: Western Digital Technologies, Inc., Irvine, CA (US)

( * ) Notice: Subject to any disclaimer, the term of this patent is extended or adjusted under 35 U.S.C. 154(b) by 16 days.

(21) Appl. No.: 13/569,144

(22) Filed: Aug. 7, 2012

(51) Int. Cl.
G11B 21/02 (2006.01)

(52) U.S. Cl.
USPC .................... 360/75; 360/77.02; 360/78.04

(58) Field of Classification Search
USPC ................ 360/75, 77.08, 77.01, 78.01, 78.04
See application file for complete search history.

(56) References Cited

U.S. PATENT DOCUMENTS

| | | | | |
|---|---|---|---|---|
| 3,753,254 | A * | 8/1973 | Ruble et al. | 360/77.02 |
| 5,128,813 | A * | 7/1992 | Lee | 360/78.07 |
| 5,185,681 | A * | 2/1993 | Volz et al. | 360/77.05 |
| 5,771,131 | A * | 6/1998 | Pirzadeh | 360/77.08 |
| 6,014,283 | A | 1/2000 | Codilian et al. | |
| 6,023,145 | A * | 2/2000 | Karaaslan et al. | 318/652 |
| 6,188,191 | B1 * | 2/2001 | Frees et al. | 318/560 |
| 6,188,531 | B1 * | 2/2001 | Chang et al. | 360/46 |
| 6,342,985 | B1 * | 1/2002 | Clare et al. | 360/75 |
| 6,687,078 | B1 | 2/2004 | Kim | |
| 6,992,851 | B1 | 1/2006 | Cloke | |
| 6,992,852 | B1 | 1/2006 | Ying et al. | |
| 7,253,985 | B1 | 8/2007 | Gami et al. | |
| 7,321,479 | B2 | 1/2008 | Kim et al. | |
| 7,502,195 | B1 | 3/2009 | Wu et al. | |

* cited by examiner

Primary Examiner — Tan X Dinh

(57) ABSTRACT

Determining the extent of thermally-induced expansion of media of a storage device. A controller may write a second signal on a number of ID and OD sideband tracks of the media immediately adjacent to a center track on which a first signal is written; calculate a jog offset range based on the number of ID and OD sideband tracks; over the calculated jog offset range, read the second signal at a first temperature and at a warmer second temperature and determining a jog value for each of the sideband tracks from a quantity related to the read second signal at the first and second temperatures; and compute a jog delta between the jog values at the first and second temperatures for each of the sideband tracks, which indicate the extent to which thermally-induced media expansion affects a position of the sideband tracks relative to the center track.

33 Claims, 4 Drawing Sheets

US 8,760,792 B1

METHODS AND DEVICES FOR DETERMINING THERMALLY-INDUCED EXPANSION OF MAGNETIC RECORDING MEDIA

BACKGROUND

FIG. 1 shows a prior art disk format 2 as comprising a number of servo tracks 4 defined by servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a servo track during write/read operations.

Magneto-resistive (MR) heads comprise a MR read element spaced apart from an inductive write element. Due to the skew angle of the MR head relative to the concentric tracks recorded on the disk, the read element may not align circumferentially with the write element. At very high recording densities (tracks-per-inch (TPI)), the radial offset between the read and write elements may range from a fraction of a track to several tracks depending on the geometries and radial position of the head. When writing data to the disk, the read element is maintained over a centerline of a "read" track while the write element writes data to a "write" track (the read and write tracks may be the same track). Due to the radial offset between the read and write elements, the data may be written along a circumferential path that is offset from the centerline of the write track. During a read operation, the read element is maintained over the circumferential path of the recorded data by introducing an offset value referred to as a "jog offset" into the servo control loop. The jog offset corresponds to the offset of the recorded data from the track's centerline.

DETAILED DESCRIPTION

During manufacture of the disk drive, jog offsets for each track are typically determined by executing a calibration procedure. A test pattern is written to a selected track and, upon read back, the read signal is evaluated to determine the centerline offset of the recorded data. The jog offsets (or parameters for calculating the jog offsets) are recorded in a reserved track (or tracks) on the disk. When the disk drive is powered on, the jog offsets are read from the reserved track(s) and stored in the semi-conductor memory. Currently, the same jog offset is used irrespective of the temperature of the media. However, the track center for writing may shift, as the media expands and contracts at different temperatures. As the writer and reader do not expand in the cross track direction relative to the media expansion, during a write, the write track may be subject to a greater shift than the read track, causing writes to undesirably occur at a position that is offset from the desired centerline of the intended track. Throughout this disclosure, jog values may be referred to as "jogs." In one embodiment, such jogs and jog values may be derived from digital-to-analog converter (DAC) counts, with each jog/jog value representing a smallest measurement unit of mechanical movement (i.e., finest granularity of mechanical movement) the actuator arm is capable of making in actuating the head. A jog offset may be expressed in terms of a number of jogs or jog values.

Figure 1:
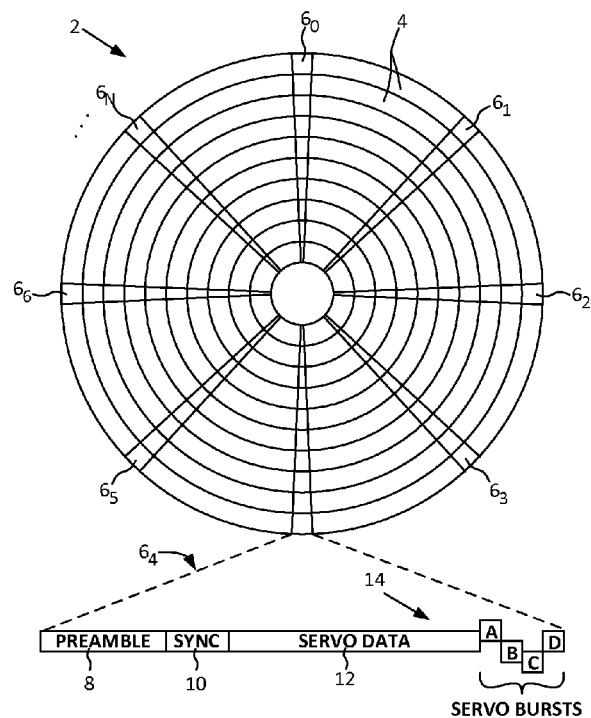
FIG. 1 shows a conventional disk format comprising a plurality of servo tracks defined by embedded servo sectors.
Figure 2:
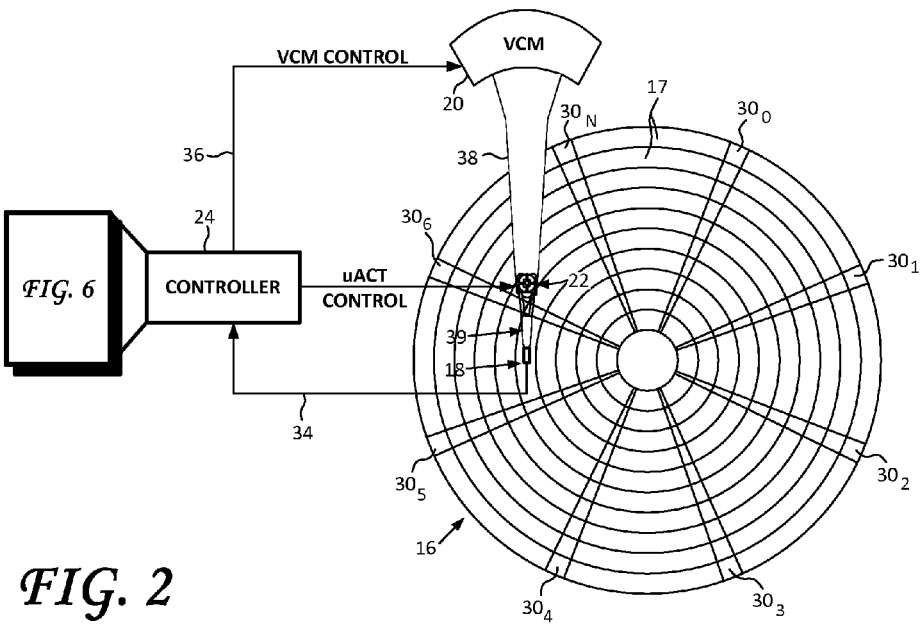
FIG. 2 shows a disk drive according to one embodiment, comprising a head actuated over a disk by a VCM and a microactuator.

FIG. 2 shows a disk drive according to one embodiment, comprising a disk 16 comprising a plurality of tracks 17, a head 18, a voice coil motor (VCM) 20 and a microactuator 22 for actuating the head 18 over the disk 16. The disk drive further comprises a controller 24 configured to execute the flow diagram of FIG. 6, among its other disk-controlling duties. As shown, the disk 16 comprises a plurality of servo sectors $30_0$-$30_N$ that define the plurality of tracks 17. The controller 24 processes read signal 34 to demodulate the servo sectors $30_0$-$30_N$ into a position error signal (PES). The PES is filtered with a suitable compensation filter to generate a control signal 36 that is applied to a voice coil motor (VCM) 20, which rotates an actuator arm 38 about a pivot in order to position the head 18 radially over the disk 16 in a direction that reduces the PES. The servo sectors $30_0$-$30_N$ may comprise any suitable position information, such as a track address for coarse positioning and servo bursts for fine positioning.

Any suitable microactuator 22 may be employed, such as a piezoelectric (PZT) actuator that transduces electrical energy into a mechanical displacement (e.g., jogs). In the embodiment of FIG. 2, the microactuator 22 is integrated with and actuates a suspension 39 that couples the head 18 to the actuator arm 38. However, the microactuator 22 may be integrated at any suitable location, such as with a slider to which the head 18 is mounted. In addition, the microactuator 22 may comprise multiple actuators (e.g., multiple PZTs) that may cooperate to move the head 18 in different radial directions.

The head 18 may comprise a read element offset from a write element (e.g., a MR head). When writing data to a selected track 17 (data track or reserved track), the head 18 may be positioned such that the read element is aligned over the centerline of a read track (using the servo bursts) and the write element may be aligned over the selected track in a manner that is offset from the selected track's centerline. When reading the recorded data from the selected track, the head may be positioned such that the read element thereof is aligned over the recorded data (offset from the selected track's centerline) by introducing a jog offset value into the servo loop. The jog offset value may be selected from, for example, a semiconductor memory based on the track number of the selected track. However, it has been found that, due to media expansion caused by increased temperatures, the jog offset value at an ambient temperature may be different from the jog offset value at higher temperatures. That is, the value of the jog offset necessary to properly position the read element for a read of data written at a first temperature may be different than the value of the jog offset necessary to properly position (e.g., at the centerline) the read element for a read of data written at a second temperature that is higher than the first temperature.

Embodiments include devices and methods for determining the extent of thermally-induced media expansion. This determination could be used to determine proper jog offsets for various temperatures. Such information could be stored in on a reserved portion of a disk and/or a semiconductor memory on the data storage device (e.g., in a lookup table comprising offset values for different temperatures or adjustment factors to be applied at different temperatures). In combination with a temperature sensor in the data storage device, the stored information may be used to enable the head to jog more accurately based on the current temperature, so as to enable a more accurate reading. As areal density increases and the track pitch narrows, such added precision will be even more important to ensure a high quality read signal.

According to one embodiment, to determine the extent of thermally-induced media expansion of a storage device, a first signal may be written to a selected center track. For example, the first signal written to the selected center track may comprise an AC erase signal. For example, the AC erase signal may comprise a predetermined pattern of low frequency and low amplitude signals. Thereafter, a second signal may be written to a predetermined number of inner diameter (ID) sideband data tracks immediately adjacent to the selected center track and the second signal may be written to a predetermined number of outer diameter (OD) sideband data tracks immediately adjacent to the selected center track. Therefore, the selected center track on which the first signal is written is bounded on the OD side thereof by a predetermined number of sideband data tracks on which a second signal is written and is bounded on the ID side thereof by a predetermined number of sideband data tracks, on which the second signal is also written. According to one embodiment, the second signal may be different from the first signal. For example, the second signal may comprise a random pattern of lower amplitude than the AC erase signal. For example, the predetermined number of ID sideband data tracks may be 10 and the predetermined number of OD sideband data tracks may also be 10.

Based upon the predetermined number of ID and OD sideband data tracks, the jog offset range may be calculated. For example, in one implementation 512 jogs may cover one servo track. However, a data track width may be different than that of a servo track. For example, the data tracks may be spaced approximately 256 jogs apart depending on the TPI (tracks per inch) selection. Thus, the number of jogs required to traverse, for example, two sets of 10 sideband data tracks (one set on the ID side and one set on the OD side) and one center track, may be approximately 5,376 jogs, as will be shown in FIG. 4. In one embodiment, the offset range essentially covers some multiple of the approximate data track width. Regardless, the jogs can be used as measurement units to account for the offset range over which the extent of thermally-induced media expansion of a storage device may be to be tested, as well as measurement units of such media expansion.

Figure 3:
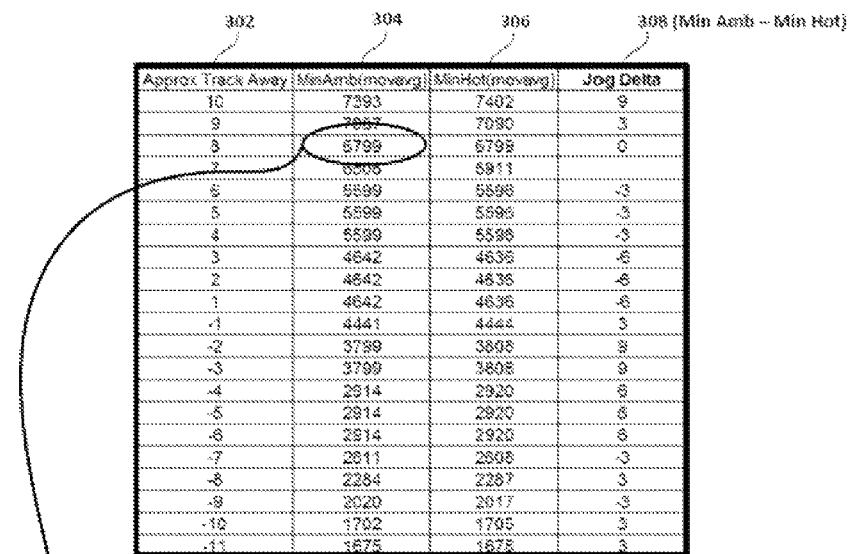
FIG. 3 shows a table of minimum jog values and calculated jog deltas, according to one embodiment.
Figure 4:
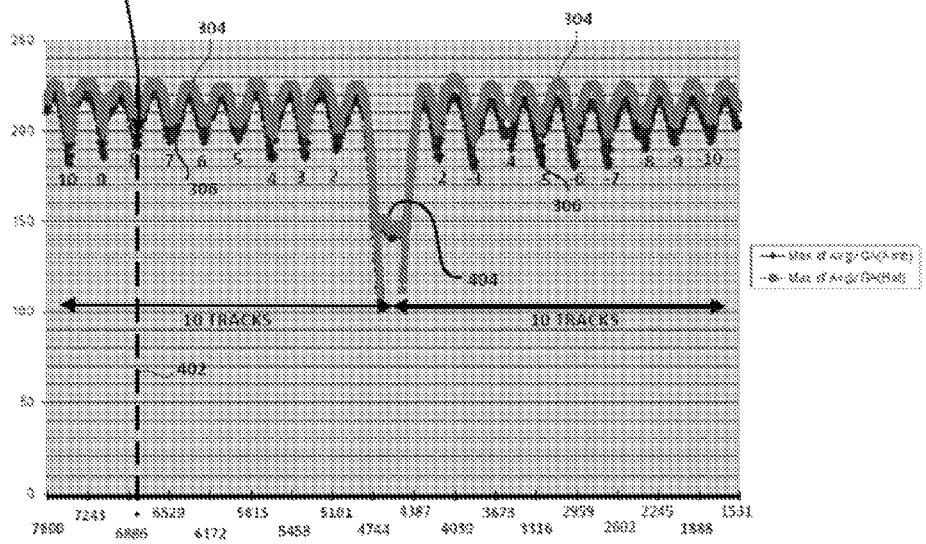
FIG. 4 shows a graph of quantized read value magnitudes over a jog offset range, according to one embodiment.

FIG. 3 shows a table of minimum jog values at a first and second temperature, together with calculated jog deltas, according to one embodiment. FIG. 4 shows a graph of quantized read value magnitudes over these jog values, according to one embodiment. As shown, the horizontal axis of the graph of FIG. 4 extends over the calculated jog offset range, being the number of jogs necessary for the head 18 to traverse 21 data tracks. The vertical axis of the graph of FIG. 4 is gradated, in this example, in a quantity related to a magnitude of the read second signal. For example, this quantity related to the magnitude of the read second signal may be a quantized value of a control (such as an Automatic Gain Control or AGC) signal of a Variable Gain Amplifier (VGA) of a read channel of the storage device. That is, the higher the amplitude of the read signal, the lower the control signal of the VGA, as the AGC strives to maintain the output signal of the VGA at a constant amplitude. In FIG. 4, therefore, the highest values of the read signal (the values of the second signal written to the ID and OD sideband tracks) will be at or near the centerline of each of the ID and OD sideband data tracks. Therefore, the local minima shown in FIG. 4 may correspond to the jog values of the centerline of the respective ID and OD sideband data tracks. In the example of FIG. 4, the value of a control signal is an 8 bit signal, corresponding to 256 discrete states, which are labeled on the vertical axis. The center dip shown at 404 corresponds to the quantity related to the magnitude of the read first signal (such as the AC erase signal, for example) at the selected center track.

FIG. 3 shows the data from which the graph of FIG. 4 was generated. As shown therein, the approximate data tracks away column 302 corresponds to the number of data tracks away from the selected center track the measurements are taken. In column 302, the OD direction is positive and the ID direction is negative. Therefore, a −8 value in column 302 indicates that the read element of the head 18 is currently located at the 8$^{th}$ ID-side sideband data track away from the selected center track. Similarly, a 4 value in column 302 indicates that the read element of the head 18 is currently located at the 4$^{th}$ OD-side sideband data track away from the selected center track. Column 304 contains the jog values (shown on the horizontal axis in FIG. 4) corresponding to the local minimum of the quantity related to a magnitude of the read second signal on the vertical axis, when the read is carried out at the first temperature. The first temperature, according to one embodiment, may be an ambient temperature, such as, for example, 25° C. For example, when the read element crosses the centerline of the 8$^{th}$ OD-side sideband data track, the quantized value related to the magnitude of the read second signal will be at a local minimum and the jog value may be recorded as 6799 as shown at 402. The jog value 6799 could be used to calculate an offset from the center track, since the selected center track also has a jog value of around 4400 as shown in FIG. 4.

Similarly, column 306 contains the jog values (shown on the horizontal axis in FIG. 4) corresponding to the local minimum of the quantity related to a magnitude of the read second signal on the vertical axis, when the read is carried out at the second temperature. The second temperature, according to one embodiment, may be a warmer temperature than the first temperature. For example, the second temperature may be 55° C. For example, when the read element crosses the centerline of the 5$^{th}$ ID-side sideband data track, the quantized value related to the magnitude of the read second signal will be at a local minimum and the jog value may be recorded as 2920.

Therefore, the read element of the head 18 may be caused to sweep over the calculated jog offset range (21 data tracks in this case), and read the second signal at the first and at the second, warmer temperature. The jog values of the centerline of each of the predetermined number of ID and OD sideband data tracks may be determined from the quantity related to a magnitude of the read second signal at each of the first and second temperatures, as shown at 304 and 306 in FIG. 4.

Column 308 of FIG. 3 contains the jog-deltas; that is, the differences between the jog values at the first temperature and the jog values at the second, warmer temperature. In this example, these differences are small, but are indicative of the extent of media expansion as the media is subjected to the second, warmer temperature, with greater jog-deltas correlating with greater degrees of thermally-induced media expansions. As shown, the jog delta may be computed between the determined jog values at the first and second temperatures for each of the predetermined number of ID and OD sideband data tracks. The thus obtained value of each of the computed jog deltas is then indicative of the extent to which thermally-induced media expansion affects a position of the centerline of each of the predetermined number of ID and OD sideband data tracks. The jog-delta for the $7^{th}$ OD-side sideband data track is not recorded, as the data for this sideband data track has been determined to be invalid as being an outlier in this example data set.

Figure 5:
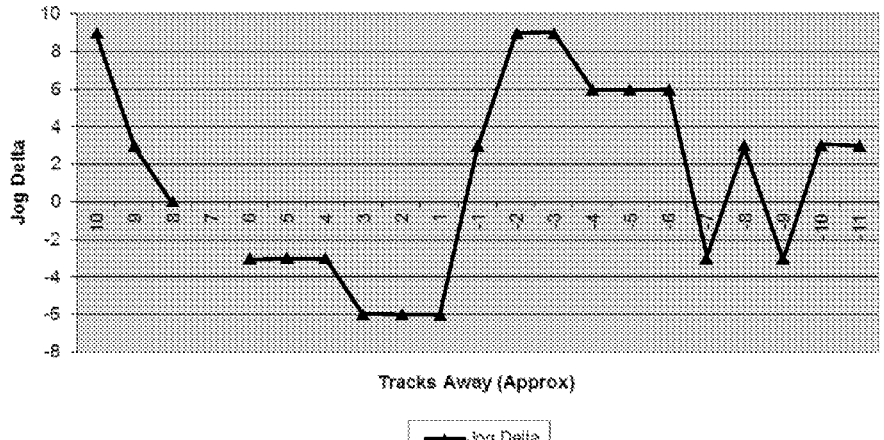
FIG. 5 is a graph of jog deltas over a calculated offset range, according to one embodiment.

FIG. 5 is a graph of jog deltas over a calculated offset range, according to one embodiment. The discontinuity in the graph at the $7^{th}$ OD-side sideband data track is due to presumptively invalid data discussed above. As shown, the jog-deltas vary within about a 17 jog range between the first and second temperatures. Such jog-deltas are, as noted above, indicative of the extent of thermally-induced media expansion of a storage device, according to one embodiment. Processes such as detailed above may provide an indication as to the underlying reasons for the occurrence of off-track write errors. For example, according to one embodiment, through examination of the jog-deltas, a failure analysis engineer may determine if an error encountered is a true servo off track write or whether the problem lies instead with thermally-induced media expansion.

Figure 6:
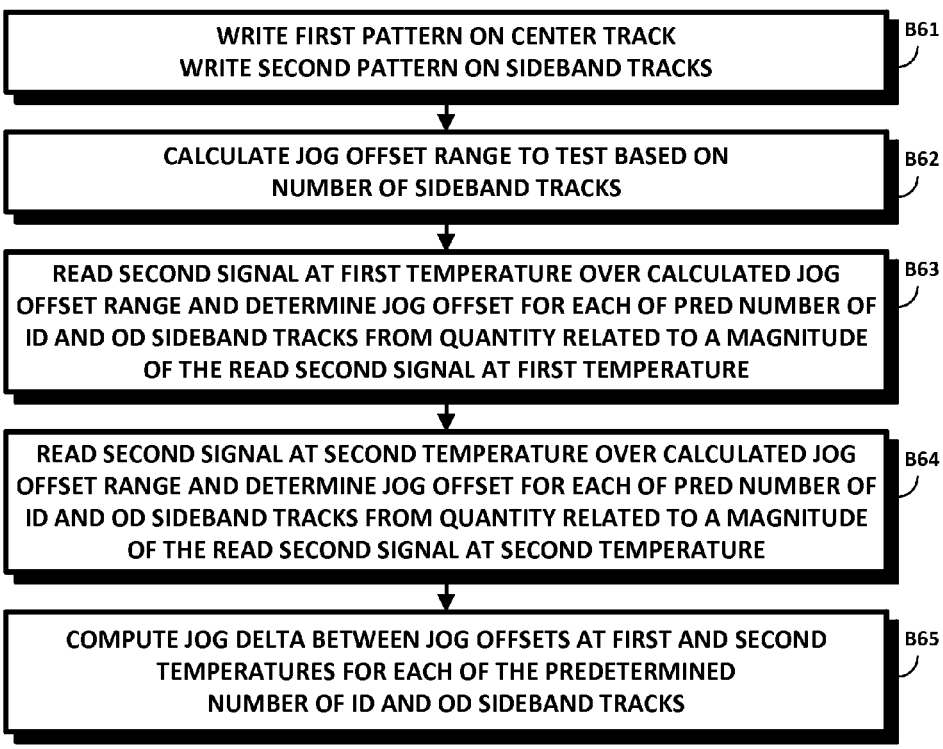
FIG. 6 is a flowchart of a process of determining an extent of thermally-induced media expansion of a storage device, according to one embodiment.

FIG. 6 is a flowchart of a process of determining an extent of thermally-induced media expansion of a storage device, according to one embodiment. As shown at Block B61, the process calls for writing a first pattern, such as an AC erase signal, for example, on a selected center track and writing a second pattern, such as a random pattern, on a predetermined number of sideband tracks. The sideband tracks may be immediately contiguous to the selected sideband track. Block B62 calls for the jog offset range to be calculated based at least upon on number of sideband tracks. For example, the jog offset range may be calculated by multiplying the number of jogs per track by a sum of the predetermined number of ID and OD sideband tracks, plus one (for the selected center track). According to one embodiment, the jog offset range determines the extent of the sweep carried out by the read element of the head 18 from which the jog values (e.g., the values recorded at 304 and 306 in FIG. 3) are determined. Block B63 then calls for reading the second signal at first temperature over calculated jog offset range and determining the jog value (as shown in column 304 in FIG. 3) for each of the predetermined number of ID and OD sideband tracks from a quantity related to a magnitude of the read second signal at first temperature. This quantity may be the minimum value, for example, of the AGC signal of the VGA of the read channel of the disk drive, within a sampling window of predetermined width. For example, the window may be 307 jogs in width, to ensure that an entire track is contained within the window while avoiding capturing more than one local minimum within the window. The window may be set based on how wide a track as measured by the number of jogs and the width of the tracks may vary based on the particular areal density of the media or the zone in which the tracks are located. Similarly, as shown at B64, the second signal may be read at second temperature over calculated jog offset range and the jog value for each of the predetermined number of ID and OD sideband tracks may be determined from the quantity related to a magnitude of the read second signal at second temp, such as AGC signal of the VGA of the read channel of the disk drive, within the aforementioned sampling window. The jog deltas between the jog values at first and second temps may then be computed, for each of the predetermined number of ID and OD sideband tracks, as shown at B65.

Figure 7:
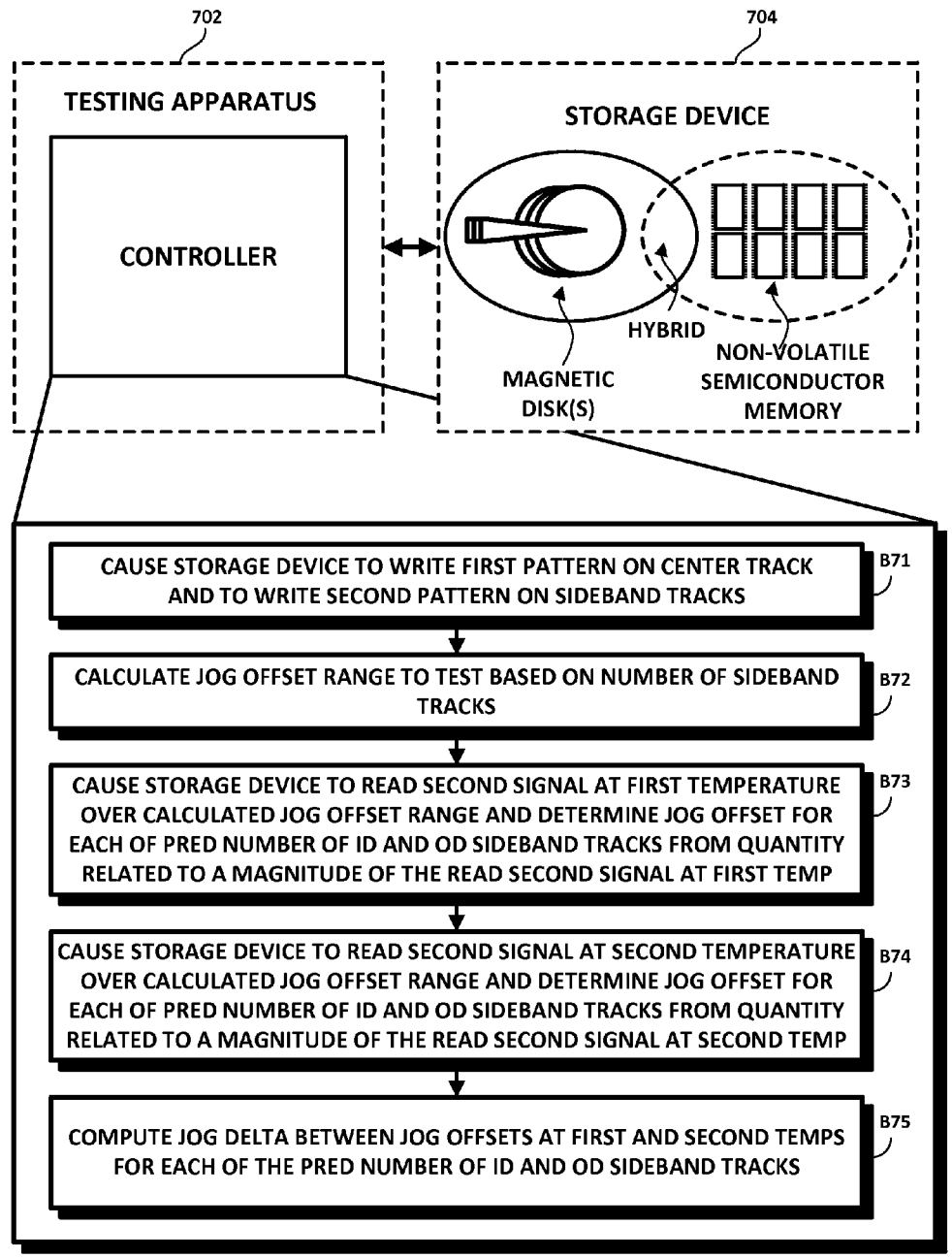
FIG. 7 is a diagram of a testing apparatus coupled to a storage device and a flowchart of a process of determining an extent of thermally-induced media expansion of a storage device, according to one embodiment.

FIG. 7 is a diagram of a testing apparatus coupled to a storage device, according to one embodiment. As shown, the testing apparatus is shown at 702 and the storage device is shown at reference 704. The storage device 704 may comprise one or more magnetic disks. The storage device 704 may also be a hybrid drive, comprising both magnetic disk(s) and an array of non-volatile semiconductor memory modules. The testing apparatus 702 may be configured, according to one embodiment, to carry out the functionality of one or more of the Block B71-B75. As shown at B71, the controller of the testing apparatus 702 may be configured to cause the storage device 704 to write a first pattern on a selected center track and to write a second pattern on a predetermined number of (e.g., ID and OD) sideband tracks. Either the storage device 704 or the testing apparatus 702 may be configured to calculate the jog offset range to test based on the predetermined number of sideband tracks, as shown at B72. As called for by Block B73, the testing apparatus 702 may be configured to cause the storage device 704 to read the second signal at the first temperature over the calculated jog offset range. Either the testing apparatus 702 or the storage device 704 may then determine the jog value for each of the predetermined number of ID and OD sideband tracks from a quantity related to a magnitude of the read second signal at first temp such as, for example, the EGC of the VGA of the read channel. As shown at Block B74, the testing apparatus 704 may then cause the storage device 704 to read the second signal at a second temperature that is warmer than the first temperature over the calculated jog offset range. Thereafter, either the testing apparatus 702 or the storage device 704 may then determine the jog values for each of the predetermined number of ID and OD sideband tracks from the quantity related to a magnitude of the read second signal at the second temperature. Lastly, either the testing apparatus or the storage device may compute the jog delta between the jog values at the first and second temperatures, for each of the predetermined number of ID and OD sideband tracks.

While certain embodiments of the inventions have been described, these embodiments have been presented by way of example only, and are not intended to limit the scope of the inventions. Indeed, the novel processes, devices and systems described herein may be embodied in a variety of other forms. Furthermore, various omissions, substitutions and changes in the form of the processes and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method of determining an extent of thermally-induced media expansion of a storage device, comprising:
    writing a first signal on a predetermined center track;
    writing a second signal on a predetermined number of inner diameter (ID) sideband tracks immediately adjacent to the center track and writing the second signal on a predetermined number of outer diameter (OD) sideband tracks immediately adjacent to the center track;
    calculating a jog offset range based on the predetermined number of ID sideband tracks and the predetermined number of OD tracks;
    over the calculated jog offset range, reading the second signal at a first temperature, and determining a jog value for each of the predetermined number of ID and OD sideband tracks from a quantity related to a magnitude of the read second signal at the first temperature;
    over the calculated jog offset range, reading the second signal at a second temperature that is warmer than the first temperature, and determining a jog value for each of the predetermined number of ID and OD sideband tracks from a quantity related to a magnitude of the read second signal at the second temperature; and
    computing a jog delta between the determined jog values at the first and second temperatures for each of the predetermined number of ID and OD sideband tracks, a value of each of the computed jog deltas being indicative of the extent to which thermally-induced media expansion affects a position of each of the predetermined number of ID and OD sideband tracks relative to the predetermined center track.

2. The method of claim 1, wherein writing the first signal comprises writing an AC erase signal.

3. The method of claim 1, wherein writing the second signal comprises writing a random pattern.

4. The method of claim 1, wherein calculating the jog offset range comprises multiplying a number of jogs per track by a sum of the predetermined number of ID and OD sideband tracks, plus one.

5. The method of claim 1, wherein the first temperature is an ambient temperature.

6. The method of claim 1, wherein calculating the jog delta comprises, for each of the predetermined number of ID and OD sideband tracks, subtracting the determined jog value at the first temperature from the determined jog value at the second temperature.

7. The method of claim 1, wherein determining the jog value for each of the predetermined number of ID and OD sideband tracks from a quantity related to the magnitude of the read second signal at the first and second temperatures comprises determining the jog value corresponding to a local minimum amplitude of the quantity related to the magnitude of the read second signal.

8. The method of claim 7, further comprising determining the jog value for the predetermined center track and wherein an amplitude of a quantity related to a magnitude of the read second signal at the jog value for the predetermined center track is smaller than the local minimum amplitude at each of predetermined number of ID and OD sideband tracks.

9. The method of claim 1, wherein the quantity related to the magnitude of the read second signal comprises a quantized value of a control signal of a variable gain amplifier of a read channel of the storage device.

10. The method of claim 1, wherein the quantity related to the magnitude of the read second signal is at a minimum when the magnitude of the read second signal is greatest.

11. The method of claim 1, wherein the local minimum is determined within a window of a predetermined jog width.

12. A storage device configured to determine an extent of thermally-induced media expansion of a storage device, comprising:
    media comprising a disk, the disk comprising a plurality of tracks configured to store data; and
    a controller being configured to:
        write a first signal on a predetermined center track of the disk;
        write a second signal on a predetermined number of inner diameter (ID) sideband tracks of the disk immediately adjacent to the center track and write the second signal on a predetermined number of outer diameter (OD) tracks of the disk immediately adjacent to the center track;
        calculate a jog offset range based on the predetermined number of ID sideband tracks and the predetermined number of OD tracks;
        over the calculated jog offset range, read the second signal at a first temperature and determining a jog value for each of the predetermined number of ID and OD sideband tracks from a quantity related to a magnitude of the read second signal at the first temperature;
        over the calculated jog offset range, read the second signal at a second temperature that is warmer than the first temperature, and determining a jog value for each of the predetermined number of ID and OD sideband tracks from a quantity related to a magnitude of the read second signal at the second temperature; and
        compute a jog delta between the determined jog values at the first and second temperatures for each of the predetermined number of ID and OD sideband tracks, a value of each of the computed jog deltas being indicative of the extent to which thermally-induced media expansion affects a position of each of the predetermined number of ID and OD sideband tracks relative to the predetermined center track.

13. The storage device of claim 12, wherein the controller is further configured to write an AC erase signal as the first signal.

14. The storage device of claim 12, wherein the controller is further configured to write a random pattern as the second signal.

15. The storage device of claim 12, wherein the controller is further configured to calculate the jog offset range by multiplying a number of jogs per track by a sum of the predetermined number of ID and OD sideband tracks, plus one.

16. The storage device of claim 12, wherein the second temperature is an ambient temperature.

17. The storage device of claim 12, wherein the controller is further configured to calculate the jog delta by, for each of the predetermined number of ID and OD sideband tracks, subtracting the determined jog value at the first temperature from the determined jog value at the second temperature.

18. The storage device of claim 12, wherein the controller is further configured to determine the jog value for each of the predetermined number of ID and OD sideband tracks from a quantity related to the magnitude of the read second signal at the first and second temperatures by determining the jog value corresponding to a local minimum amplitude of the quantity related to the magnitude of the second signal.

19. The storage device of claim 12, wherein the controller is further configured to determine the jog value for the predetermined center track and wherein an amplitude of a quantity related to a magnitude of the read second signal at the jog value for the predetermined center track is smaller than the local minimum amplitude at each of predetermined number of ID and OD sideband tracks.

20. The storage device of claim 12, wherein the quantity related to the magnitude of the read second signal comprises a quantized value of a control signal of a variable gain amplifier of a read channel of the storage device.

21. The storage device of claim 12, wherein the quantity related to the magnitude of the read second signal is at a minimum when the magnitude of the read second signal is greatest.

22. The storage device of claim 12, wherein the controller is further configured to determine the local minimum within a window of a predetermined jog width.

23. A testing apparatus coupled to a storage device, the storage device comprising a disk that comprises a plurality of tracks configured to store data, the testing apparatus comprising:
a controller configured to:
cause the storage device to write a first signal on a predetermined center track of the disk;
cause the storage device to write a second signal on a predetermined number of inner diameter (ID) sideband tracks of the disk immediately adjacent to the center track and write the second signal on a predetermined number of outer diameter (OD) tracks of the disk immediately adjacent to the center track;
calculate a jog offset range based on the predetermined number of ID sideband tracks and the predetermined number of OD tracks;
cause the storage device, over the calculated jog offset range, to read the second signal at a first temperature and determining a jog value for each of the predetermined number of ID and OD sideband tracks from a quantity related to a magnitude of the read second signal at the first temperature;
cause the storage device, over the calculated jog offset range, to read the second signal at a second temperature that is warmer than the first temperature, and determining a jog value for each of the predetermined number of ID and OD sideband tracks from a quantity related to a magnitude of the read second signal at the second temperature; and
compute a jog delta between the determined jog values at the first and second temperatures for each of the predetermined number of ID and OD sideband tracks, a value of each of the computed jog deltas being indicative of the extent to which thermally-induced media expansion affects a position of each of the predetermined number of ID and OD sideband tracks relative to the predetermined center track.

24. The testing apparatus of claim 23, wherein the controller is further configured to write an AC erase signal as the first signal.

25. The testing apparatus of claim 23, wherein the controller is further configured to write a random pattern as the second signal.

26. The testing apparatus of claim 23, wherein the controller is further configured to calculate the jog offset range by multiplying a number of jogs per track by a sum of the predetermined number of ID and OD sideband tracks, plus one.

27. The testing apparatus of claim 23, wherein the second temperature is an ambient temperature.

28. The testing apparatus of claim 23, wherein the controller is further configured to calculate the jog delta by, for each of the predetermined number of ID and OD sideband tracks, subtracting the determined jog value at the first temperature from the determined jog value at the second temperature.

29. The testing apparatus of claim 23, wherein the controller is further configured to determine the jog value for each of the predetermined number of ID and OD sideband tracks from a quantity related to the magnitude of the read second signal at the first and second temperatures by determining the jog value corresponding to a local minimum amplitude of the quantity related to the magnitude of the second signal.

30. The testing apparatus of claim 23, wherein the controller is further configured to determine the jog value for the predetermined center track and wherein an amplitude of a quantity related to a magnitude of the read second signal at the jog value for the predetermined center track is smaller than the local minimum amplitude at each of predetermined number of ID and OD sideband tracks.

31. The testing apparatus of claim 23, wherein the quantity related to the magnitude of the read second signal comprises a quantized value of a control signal of a variable gain amplifier of a read channel of the storage device.

32. The testing apparatus of claim 23, wherein the quantity related to the magnitude of the read second signal is at a minimum when the magnitude of the read second signal is greatest.

33. The testing apparatus of claim 23, wherein the controller is further configured to determine the local minimum within a window of a predetermined jog width.

* * * * *